June 19, 1951 G. RAYMOND ET AL 2,557,202
TOOL FOR APPLYING REPAIR PLATES TO PIPE LINES
Filed Jan. 2, 1948 2 Sheets-Sheet 1
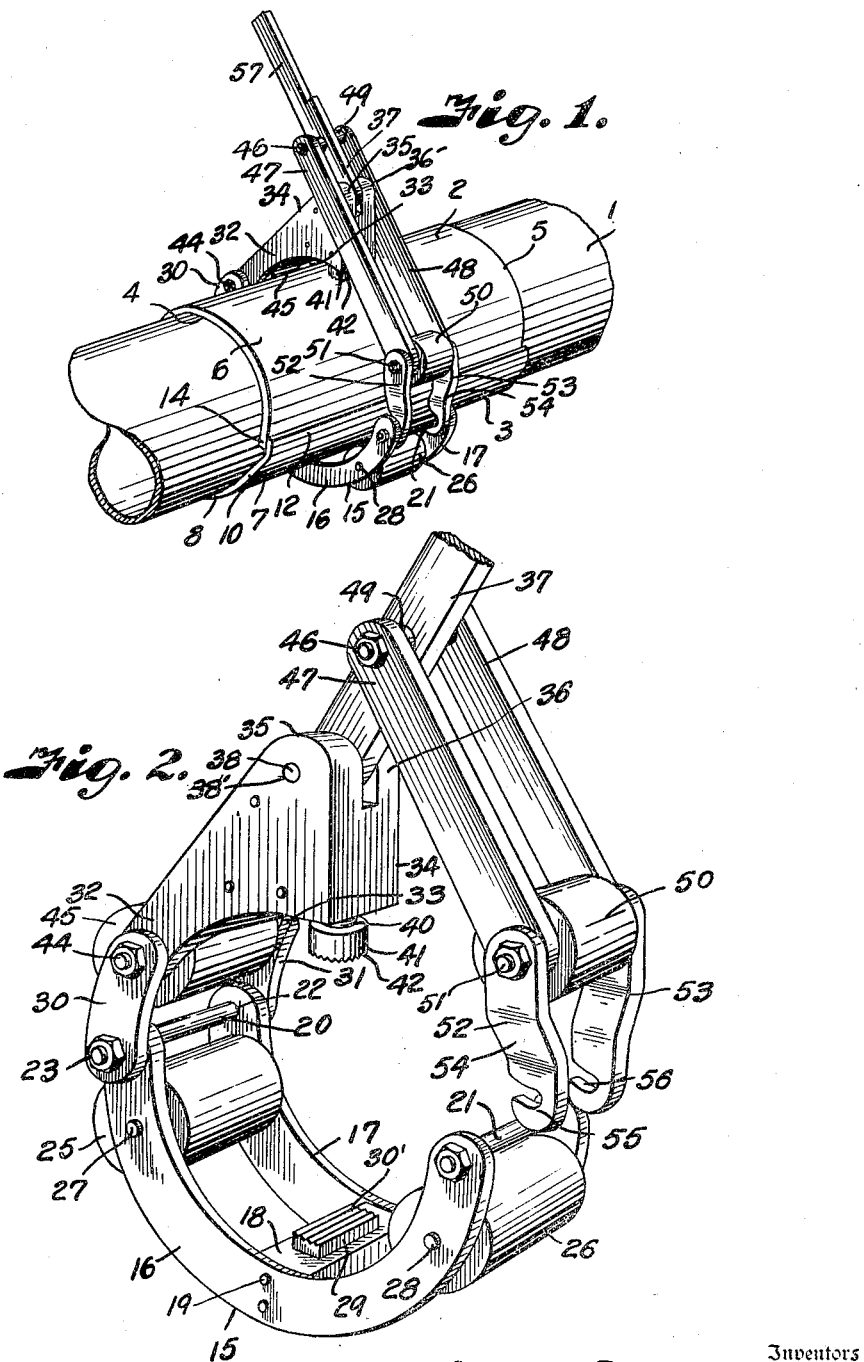
Inventors
Gwynne Raymond, and
Vivian C. Harris.
By
Fishburn & Mullendore
Attorneys

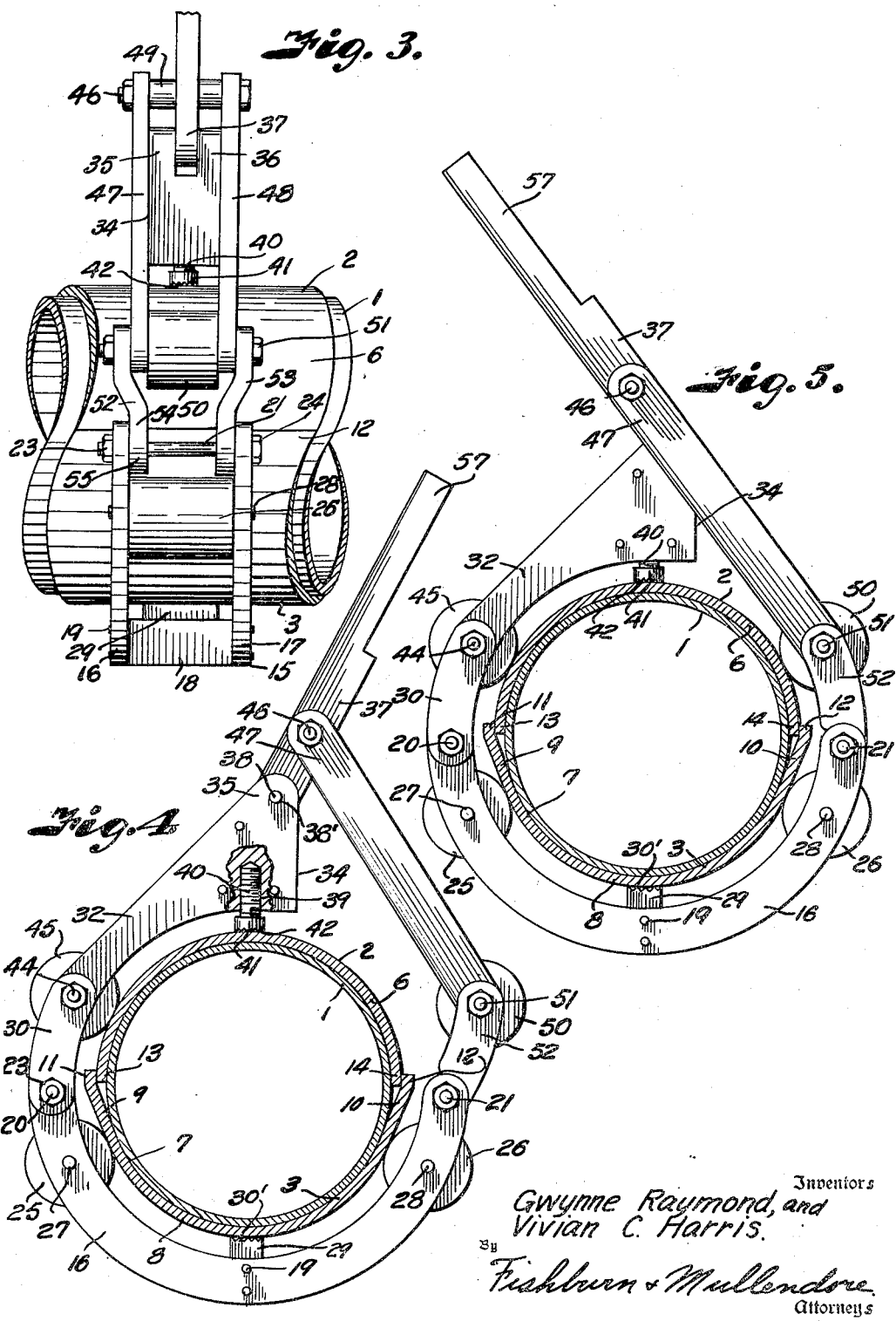

Patented June 19, 1951

2,557,202

UNITED STATES PATENT OFFICE 2,557,202

TOOL FOR APPLYING REPAIR PLATES TO PIPE LINES

Gwynne Raymond and Vivian C. Harris, Oklahoma City, Okla., assignors to Black, Sivalls & Bryson, Inc., Kansas City, Mo., a corporation of Delaware Application January 2, 1948, Serial No. 90

3 Claims. (Cl. 113—102)

This invention relates to a tool for applying repair plates known as half soles to pipe lines, particularly pipe lines used in conveying petroleum products and similar liquids which pipe lines are subject to deterioration by electrolysis and oxidation to the point where leaks occur or are threatened; and it is the practice to make repairs by welding semicylindrical plates or half soles about the leaking or weakened portions of the pipe line.

Much difficulty has been experienced in getting the half soles in place and properly welded, particularly where the pipe line is underground. It is, therefore, the principal object of the present invention to provide a tool by which such half soles may be drawn up tightly against the pipe and clamped while the half soles are welded along the edges and the ends thereof to the pipe.

Other objects of the invention are to provide a tool of this character that is of simple construction and which may be readily placed and manipulated on a pipe; to provide a tool having clamping jaws to draw the upper half sole into contact with the pipe prior to drawing of the longitudinal edges of the lower half sole into contact with the lower longitudinal edges of the upper half sole; and to provide a tool with an adjustable jaw for accommodating the jaws to the size of the half soles to be applied to a pipe.

In accomplishing these and other objects of the invention hereinafter pointed out, we have provided improved structure, the preferred form of which is illustrated in the accompanying drawings wherein:

Fig. 1 is a perspectvie view of a portion of a pipe line on which half soles have been positioned and are being drawn into contact with the pipe by a tool constructed in accordance with the present invention preparatory to welding of the half soles.

Fig. 2 is an enlarged perspective view of the tool as it appears when removed from the pipe, the latch hooks being disengaged from the lower section of the jaw supporting frame to permit application of the tool.

Fig. 3 is a side elevational view of the tool applied to the half soles on a pipe as shown in Fig. 1.

Fig. 4 is a cross section through the pipe and half soles showing the half soles being tightened about the pipe.

Fig. 5 is a similar view but showing the tool in clamping position with the half soles in position to be welded to the pipe.

Referring more in detail to the drawings:

I designates a section of a pipe line which requires a repair by placement of upper and lower half soles 2 and 3 over a leak or weakened portion thereof and which are adapted to be welded to the pipe at the ends 4 and 5 and along the longitudinal edges of the half soles as later described.

The upper half sole 2 may consist of a substantially semi-cylindrical plate 6 having an inner radius conforming with the radius of the pipe and of a length to bridge the defective portion of the pipe. The lower half sole includes a plate 7 of corresponding length and having a mid portion 8 curved to substantially conform with the radius of the pipe and outwardly flaring side portions 9 and 10 which are adapted to be drawn into tangential contact with the pipe and which terminate in longitudinal flange portions 11 and 12 to overlap the longitudinal side edges 13 and 14 of the upper half sole when the bearing portions are drawn into tangential contact. When in position on the pipe, the ends 4 and 5 of the half soles are welded circumferentially to the pipe and the flanges 11 and 12 are welded along the length thereof to the underlying edges of the upper half sole to complete the repair.

As previously stated, it is difficult to place the half soles and retain them in position on the pipe during welding thereof and in order to facilitate this procedure, we provide a tool for drawing the half soles into firm contact with the pipe and hold the half soles in position during the welding process.

The tool illlustrated includes a lower frame section 15 including semi-circular members 16 and 17 spaced apart by an intermediate bar 18 which is fixed to the semi-circular members by fastening devices such as cap screws 19. The ends of the members are also interconnected by rods 20 and 21 which may comprise bolts having the shanks projected through suitable openings 22 in the ends of the members 16 and 17 and secured therein by nuts 23 and heads 24. Rotatably mounted between the frame members 16 and 17 directly below the rods 20 and 21 are rollers 25 and 26 preferably of cylindrical form and adapted to contact the lower half sole adjacent the flaring portions thereof as shown in Figs. 4 and 5. The rollers 25 and 26 may be rotatably mounted on rods 27 and 28 having the ends fixed in suitable openings of the frame members 16 and 17. Mounted on the bar 18 is a fixed jaw 29 having teeth 30' extending longitudinally of the axis of the pipe and adapted to engage the under half sole at the mid portion thereof so as to support the half sole in position for contacting the lower center of the pipe while the rollers 25 and 26 are drawing the flaring portions 9 and 10 of the half sole into position as later described. Pivotally mounted on the ends of the bolt or rod 20 between the terminals of the frame members 16 and 17 and the head and nut of the bolt are links 30 and 31 to which are connected spaced arms 32 and 33 of a head member 34. The head member 34 and underside of the arms are curved to follow the curvature of the frame members 16 and 17 as shown in Figs. 4 and 5. The head also includes spaced ears 35 and 36 for pivotally mounting an actuating lever 37 therebetween on a rod 38 having the ends mounted in suitable openings 38' in the ears as best shown in Fig. 2.

Opening into the head from the curved side thereof and in vertical alignment with the fixed jaw is an internally threaded socket 39 to mount the threaded shank 40 of an adjustable jaw 41 having teeth 42 for engaging the central portion of the upper half sole. The arms 32 and 33 are connected with the links 30 and 31 by a bolt or rod 44 which also mounts a roller 45, the roller being journalled on the rod between the arms 32 and 33. Pivotally connected with the lever arm by a bolt 46 that extends transversely therethrough are links 47 and 48, the links being spaced from the lever by collars 49 mounted on the bolt 46 as shown in Figs. 2 and 3.

Mounted between the opposite ends of the links is a roller 50 that is journalled on the shank of a bolt 51 that extends through the roller and ends of the links 47 and 48 and which is of sufficient length to mount links 52 and 53 having inwardly offset portions 54 terminating in hooks 55, the hooks having arcuate notched portions 56 whereby the hooks are adapted to engage the shank of the bolt or rod 21 to complete encirclement of the tool with the half soles when the tool is applied thereto as now to be described.

In forming a repair with half soles and utilizing a tool constructed and assembled as described, the hook links 52 and 53 are disengaged from the shank of the bolt 21 and the links 47 and 48, head 34 and links 30 and 31 are swung outwardly to permit the ends of the frame members 16 and 17 which carry the bolt 21 to be passed under the pipe. The lower half sole 3 may then be placed upon the rollers 25 and 26 with the central portion in position to be engaged by the teeth of the fixed jaw 29. The upper half sole 2 is then applied over the top of the pipe whereupon the head 34 carried by the links 30 and 31 is swung over the top of the upper half sole so that the adjustable jaw 41 will come into contact with the central portion of the upper half sole 2. The ends of the links 52 and 53 are then hooked to the bolt 21 as shown in Fig. 4. A pipe extension (not shown) may then be applied to a cut down terminal 57 of the lever and the lever swung in an anti-clockwise direction (Fig. 4) to move the roller 50 into contact with one side of the upper half sole while the roller 45 is drawn into contact with the opposite side. Continued movement of the lever results in clamping the top half sole to the top portion of the pipe while the rollers 25 and 26 bend the flaring portions 9 and 10 of the lower half sole into position so that the flanged terminals 11 and 12 thereof overlap and engage the terminal edges of the upper half sole. The arrangement of the pivotal connection is such that with the jaw 41 properly adjusted it will permit the pivotal connection afforded by the bolt 46 to pass slightly over dead center position relative to the axis of a plane passing through the rod 38 and the axis of the roller 50 whereupon the tool retains the half soles in clamped condition about the pipe with the flange portions of the lower half sole retained in gripping contact with the terminal edges of the upper half sole. The ends of the half soles may then be welded to the pipe while they are retained in clamped position. The end portions of the overlapping flanges 11 and 12 may also be welded to the side edges of the upper half sole. The lever 37 may then be swung in opposite position as shown in Fig. 4, which swings the roller 50 outwardly to permit release of the hook ends of the links 52 and 53. The entire tool may then be withdrawn from the pipe with the free ends of the frame members 16 and 17 being drawn from underneath the lower half sole. After removal of the clamp, the longitudinal welds may be completed to finish the repair.

From the foregoing it is obvious that I have provided a tool for positioning half soles in a firm contact with a pipe and which also serves as a clamp to retain the half soles while they are being welded to the pipe.

What we claim and desire to secure by Letters Patent is:

1. A device for applying half soles to pipes including a substantially semi-circular section, a jaw carried by the semi-circular section, rollers on the semi-circular section on opposite sides of the jaw to press sides of the half sole toward the pipe, a lever section, a lever pivotally mounted on the lever section, a link connection between said lever section and one end of the semi-circular section, a hook connection at the other end of the semi-circular section and pivotally connected with the lever, and a jaw carried by the lever section to press the other half sole against the pipe when the lever is operated to draw the sections toward the pipe, said last-named jaw being adjustable relatively to the lever section.

2. A device for applying half soles to a pipe including a substantially semi-circular section, a jaw carried by the semi-circular section for engaging a mid portion of one half sole, rollers on the semi-circular section on opposite sides of the jaw to press sides of the half sole toward the pipe, a lever section, a link pivotally connecting the lever section with the semi-circular section, a lever having pivotal connection with the lever section, a link and hook for coupling the lever with the semi-circular section, a jaw carried by the lever section in substantially diametrically opposed relation with the first-named jaw to support the other half sole against the pipe, and rollers carried by said links adjacent the ends remote from the semi-circular section to press the sides of the upper half sole in contact with the pipe upon actuation of the lever.

3. A device for applying half soles to a pipe, including a substantially semi-circular frame section, a jaw carried by the semi-circular frame section for engaging under substantially the mid point of one lower half sole to support the mid portion of the half sole in contact with the pipe, rollers carried by the frame section on opposite sides of the jaw to engage the respective sides of the half sole, a lever section, a link section connecting the lever section with one end of the semi-circular frame section, a jaw carried by said lever section adapted to engage the mid portion of the other half sole, a roller carried by said link section adjacent the end remote from the semi-circular frame section for engaging one side of said other half sole, a lever having pivotal connection with the lever section, means connecting the lever with the other end of the semi-circular frame section, and a roller carried by said connecting means for engaging the opposite side of said other sole to cooperate with the other rollers in pressing said sides of the half soles in contact with the pipe upon actuation of the lever.

GWYNNE RAYMOND.
VIVIAN C. HARRIS.

REFERENCES CITED

The following references are of record in the file of this patent:

UNITED STATES PATENTS

| Number | Name | Date |
|---|---|---|
| 1,150,663 | Cosseboom | Aug. 17, 1915 |
| 1,173,496 | Elzay | Feb. 29, 1916 |
| 1,550,161 | Hamm et al. | Aug. 18, 1925 |
| 1,774,530 | Sheehan | Sept. 2, 1930 |
| 1,794,450 | Duncan | Mar. 3, 1931 |
| 1,969,572 | Maurer | Aug. 7, 1934 |
| 2,127,828 | Milton | Aug. 23, 1938 |